July 11, 1961  W. H. ABRAHAMS, JR., ET AL  2,991,563
CONTROL TOWER SIMULATOR
Filed Jan. 6, 1960  4 Sheets-Sheet 1

INVENTORS.
WILLIAM H. ABRAHAMS JR.
& OLIVER W. TAYLOR
BY
Wade Loomis and
Sherman H Goldman
ATTORNEYS July 11, 1961  W. H. ABRAHAMS, JR., ET AL  2,991,563
CONTROL TOWER SIMULATOR Filed Jan. 6, 1960  4 Sheets-Sheet 2

INVENTORS.
WILLIAM H. ABRAHAMS
& OLIVER W. TAYLOR
BY
Wade Koontz
Sherman H. Goldman
ATTORNEYS

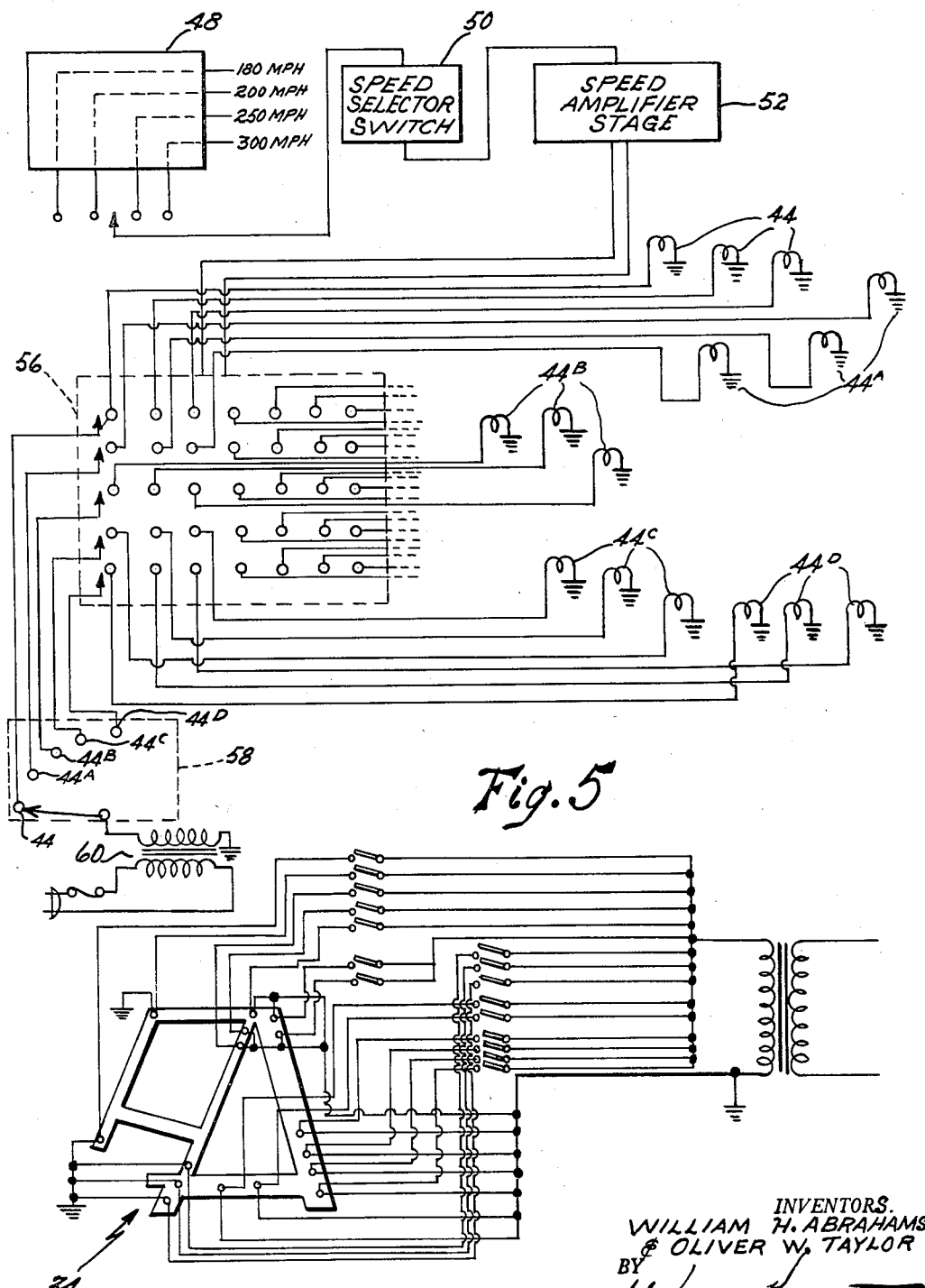

2,991,563
CONTROL TOWER SIMULATOR

William H. Abrahams, Jr., 2700 33rd St. S.E., Washington 20, D.C., and Oliver W. Taylor, Washington, D.C. (Box 2869, Edwards A.F.B., Calif.)
Filed Jan. 6, 1960, Ser. No. 899
3 Claims. (Cl. 35—12)

This invention relates to training devices that acquaint presonnel being trained as control room operators in control towers of airports with the operational use of the means provided for directing air traffic. It is briefly a control tower simulator particularly useful in training and maintaining the proficiency of control tower operators at any specified location and is also useful in training personnel in the fundamentals of control tower operation at the school level. It is estimated that it will cut the training time of a control tower operator by 50%.

It is a general object of this invention to provide a control tower simulator which will give a visual representation of any airfield and its approaches and permit the presentation of air traffic control problems which may arise in the usual course of normal tower operation.

It is a further object to provide in connection with the visual representation of an airfield and its approaches, a "mock-up" of a control tower operator's console so that a trainee can both see and hear the problem presented and operate the controls provided accordingly.

It is also an object of this invention to provide an instructor's console containing electronic means connected to a display board and to a student's console whereby the instructor can set up a realistic problem involving a plurality of planes approaching for a landing or requesting take-off instructions, or any other problem which may arise in normal air traffic control.

Another object is to provide a control tower simulator which is simple and effective.

The above and still other objects, advantages and features of our invention will become apparent upon consideration of the following detailed description of one embodiment thereof, especially when taken in conjunction with the accompanying drawings, in which:

FIG. 5 is a schematic diagram showing the wiring of the components used for the display of one flight on the display board;

FIG. 7 is a schematic diagram showing how the parking lights are controlled.

Figure 4:
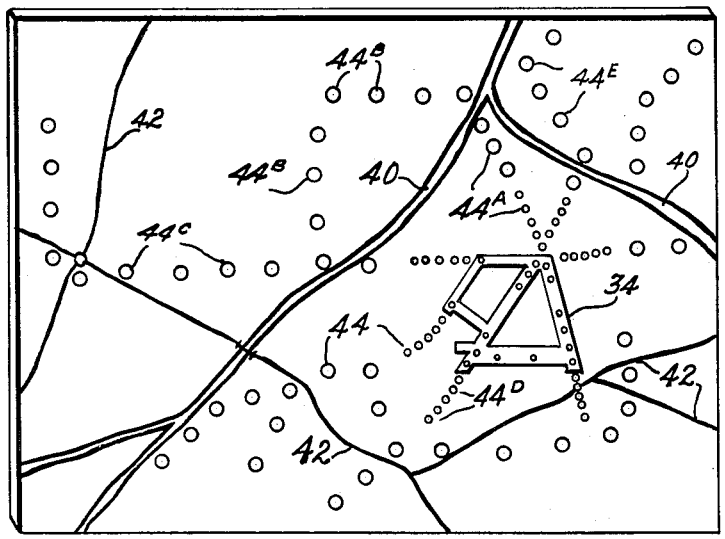
FIG. 4 is a plan view of a simulated airfield and its approaches.

The principal feature of this invention is a display board 16 best seen in FIG. 4. It consists of a board of suitable size, preferably about 4 x 6 feet, painted and drawn to scale to represent a particular airfield 34, and its approaches. On it are shown two streams 40 and highways 42 traversing the terrain. Also shown are a series of strings of light bulbs 44, 44A, 44B, 44C, 44D, etc., which, when illuminated in succession and at varying time intervals, simulate the paths and speeds of departing, arriving or circling planes.

The spacing of the lights in a string is such that, at the scale at which the board is drawn, a realistic indication of the speed of an arriving or departing plane is given.

The distances between lights near the ends of the runways is less than at the farther end of the string. This is done to give the illusion of the lessening of the speed of a plane as it approaches the runway for a landing or increasing speed as it departs. This illusion is created because the shorter distance between lights takes the same amount of time for a plane to traverse the shorter distance. For instance, with the lights near the runways spaced 1¼ inches apart representing ¼ of a mile on the ground, gradually increasing to 2½ inches apart near the farther end of the path, the apparent speed will be halved as it approaches the runway. The time interval between the lighting of bulbs in a string on such a board could be 8 seconds representing a speed of 300 miles an hour for a plane as it first came in view. As the plane approaches the runway of the airfield 34 its speed would naturally be reduced and this illusion is created on the board as the spacing of the lights decreases while the time interval remains the same.

The display board 16 is placed in front of a student's console 10 (FIG. 2) where it can be seen easily by the student operator. The series of strings of lights 44, 44A, 44B, etc., are lit in succession and at time intervals to represent the path and speed of a plane by the components shown diagrammatically in FIG. 5. An interval timer 48 (FIGS. 5 and 6) generates timed pulses which represent the speed of planes. The interval timer 48 is shown connected through a speed selector switch 50 (FIG. 5) to a conventional vacuum tube amplifier 52. A relay in the plate circuit of the said amplifier actuates a conventional stepping switch 56. The stepping switch 56 is provided with a plurality of switch decks, each deck having a plurality of switch points which are contacted by a switch arm. The switch points on a deck are connected in succession to electric bulbs in one of the series of strings of bulbs. String 44, for example, is connected to the switch points on the first deck, 44A to the switch points on the second deck, 44B to the switch points on the third deck, etc. One deck may have the first contact connected to the bulb nearest the airfield with succeeding bulbs being farther away from the starting point to simulate the flight of a plane on take-off. Another deck will have its first contact point connected to the bulb farthest away from the field to simulate a plane coming in for a landing. The contact arm for each deck is connected to a switch point on a rotary pattern selector switch 58. The contact arm of the switch 58 is connected to one side of a source of power 60, which could be the secondary of a transformer supplying 6.3 volts or any other suitable source of power. The other side of the said source of power is connected to a ground point in common with one side of the filament of each bulb to be lighted.

Figure 6:
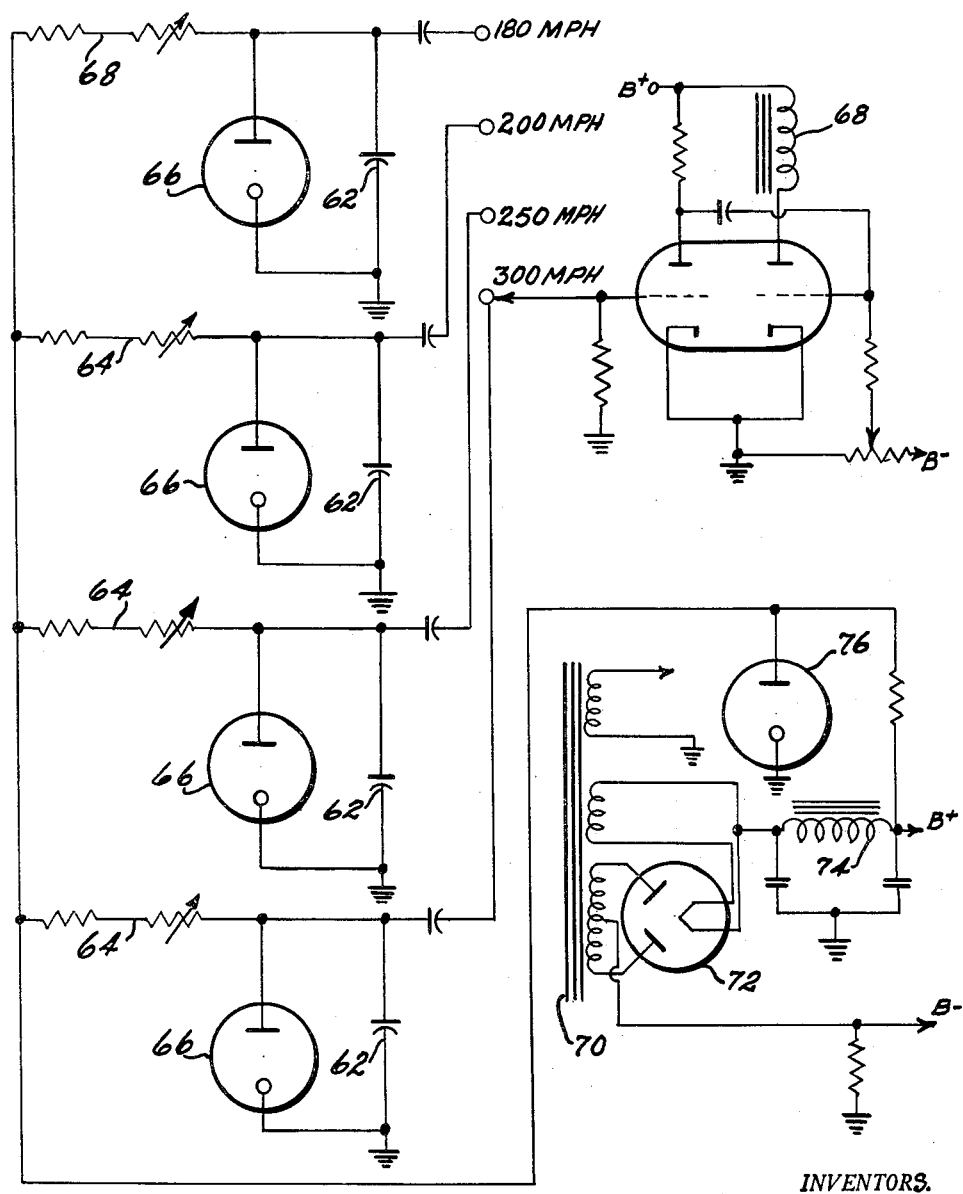
FIG. 6 is a schematic wiring diagram of the interval timer and the amplifier.

The interval timer 48 is shown schematically in FIG. 6. It comprises a conventional relaxation oscillator consisting of a condenser 62 charged through a variable resistor 64. Current is supplied to the oscillator by a conventional voltage regulated power supply, comprising a power transformer 70, a rectifier 72, a choke and condenser filter 74 and a voltage regulator tube 76. The power supply also furnishes unregulated current to the amplifier 52. The condenser is shunted by a neon bulb 66 so that when the charge on the condenser reaches the breakdown voltage of the bulb the condenser discharges through the bulb. The pulse generated by this discharge is fed to the amplifier 52 where it is amplified and energizes a plate relay 68 in the output of the amplifier. This plate relay closes a circuit in a conventional stepping relay or switch 56, which, in a well known manner, causes each switch arm in said relay switch to advance one step. As shown in FIG. 5 this causes one bulb to light in the string chosen. The next pulse causes the switch arm in switch 56 to move to the next point and light the next bulb in the chosen string, etc. The time interval between pulses is determined by the size of the condenser and the resistance in series with it and in this application will be between 8 and 16 seconds, thus simulating the speed of planes traversing the area at 300, 250, 200 and 150 miles per hour on the chosen path.

To set up a problem in parking the instructor utilizes a series of switches and bulb shown schematically in FIG. 7. Since the speed of planes on the runway is not uniform the instructor manually sets the switches to show the course of a plane on the runway and its speed until it has come to a stop. The light representing the stopping point is allowed to remain lit to represent a parked plane.

Figure 1:
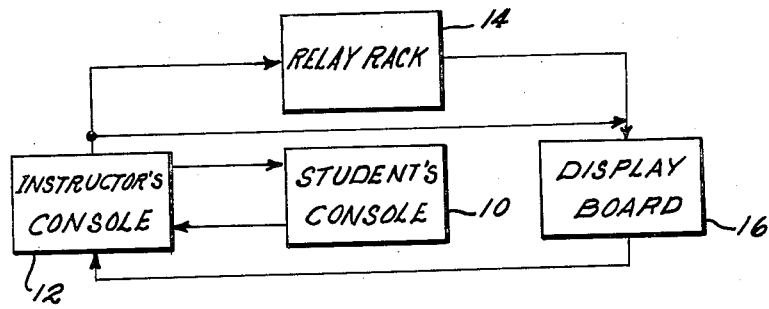
FIG. 1 is a block diagram showing the connections of the various parts of the invention.
Figure 2:
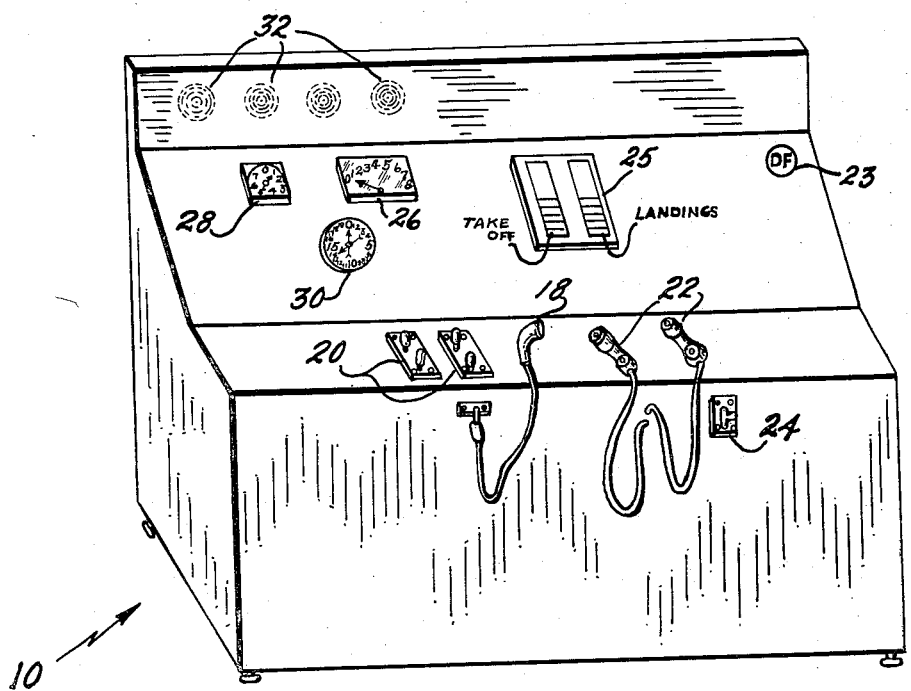
FIG. 2 is an isometric view showing a student's console.
Figure 3:
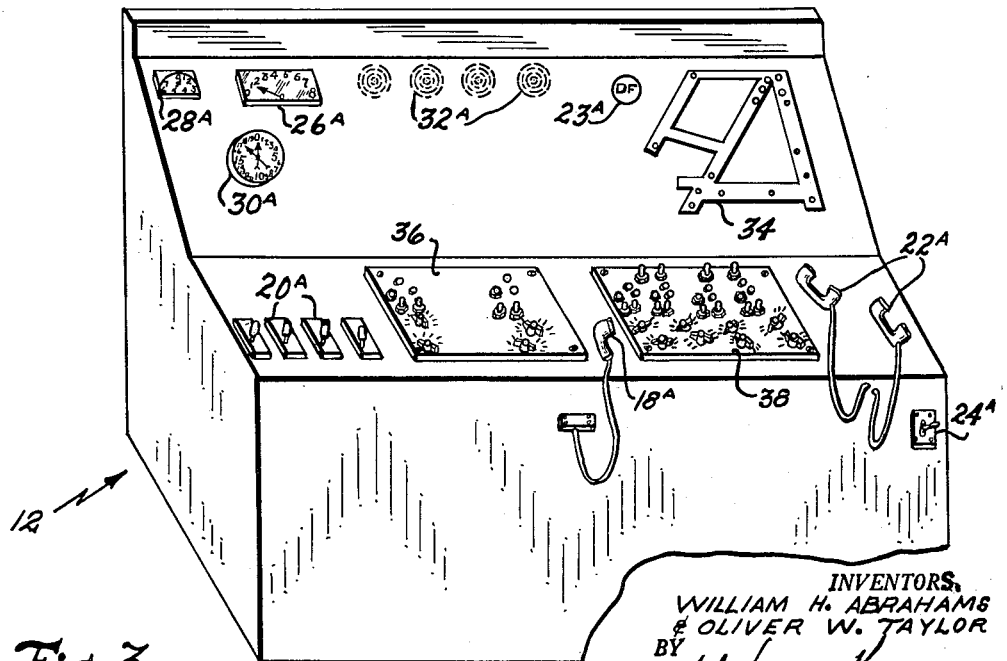
FIG. 3 is an isometric view showing an instructor's console.

The block diagram of FIG. 1 shows a student's console 10 interconnected to an instructor's console 12 which latter console is connected through a relay rack 14 and through direct connections, to the display board 16. Relay rack 14 contains the interval timer 48, the amplifier stage 52 and the stepping switch 56. The student's console 10 is shown in FIG. 2 and has a microphone 18 which can be connected to any one of four channels of communication with the instructor's console through switches 20 to simulate communication with a plane. In order to render a realistic display in accordance with actual control tower apparatus phones 22 are provided and can be connected to either of two simulated land telephone lines through switch 24, a direction finder shown as 23, a wind velocity indicator as 26, an altimeter as 28 and a wind direction indicator as 30. Four loudspeakers are shown at 32 and at 25 is shown a rack for containing slips for recording the landing and take-off of planes. An instructor's console 12, shown in FIG. 3, has duplicates of the instruments shown on the student's console 10 and controls them through electronic means. The microphone, 18A, on the instructor's console connects with the speaker's 32, on the student's console 10, through appropriate amplifiers. A direction finder 23A, a wind velocity indicator 26A, and a wind direction indicator 30A are all interconnected with similar instruments on student's console 10 and controls them through conventional selsyns. In addition the instructor's console 12 has two groups of switches and lights 36 and 38 for presenting problems in landing and take-off for various speeds, directions and for various types of planes. These switches control the components in relay rack 14 and the lights on display board 16.

In use the instructor decides on a problem for a student involving two conventional planes, one requesting landing instructions and another requesting take-off instructions. He decides on a wind direction and velocity and sets his instruments accordingly which settings will appear on the student's console. He then uses one of the land telephone lines to communicate to the student's console the weather conditions which are to prevail during the problem. He then decides on the paths and speeds of the planes, sets the controls accordingly, and calls the student's console to simulate calls from the planes. The student having the board in front of him sees the lights simulating the approaching plane and the parked plane and acts accordingly. He has in front of him all the information he would have if he were in an actual control tower with one plane approaching for a landing and another on the ground asking for take-off instructions and all the apparatus of an actual control tower for directing the two planes. Each plane in a problem requires one stepping relay or switch, an interval timer, the necessary switches and string of lights associated with it. The number of planes in a problem is limited only by the number of stepping switches, and the associated equipment, employed. Appropriate switches (not shown) in the circuit to a stepping switch allow a problem to be stopped at any time for discussion.

It is obvious from the foregoing description and drawings that this invention fulfills its object of supplying a visual and aural device for simulating problems which arise in the normal operation of a control tower of an airport and is useful not only in training control tower operators but in keeping up the efficiency of operators already trained and acquainting them with a particular airfield with which they may not be familiar.

Although the invention is described relative to a particular embodiment, it should be understood to those skilled in the art that the invention is capable of a variety of alternative embodiments within the spirit and scope of the appended claims.

We claim:

1. An airfield simulator comprising a sheet of material having a scalar representation thereon of an airfield and its approaches, a plurality of strings of lights on said sheet of material oriented in take-off, landing and taxi patterns, means to light in succession the bulbs in any of said strings of lights, and means providing a time interval between the successive lighting of bulbs in a string of lights to represent the paths and speeds of planes, said means for lighting the bulbs in succession and at time intervals comprises a source of regulated current, a condenser charged by said current through a resistor, a neon bulb shunted across said condenser to discharge said condenser when the charge on said condenser equals the break-down voltage of said neon bulb, a conventional amplifier to amplify the pulse created by the discharge of said condenser, and a relay in the output of said amplifier to close a circuit in a conventional stepping relay to advance said relay one step to light the bulbs in a string of lights in succession.

2. An airfield simulator comprising a sheet of material having a scalar representation thereon of an airfield and its approaches, a plurality of strings of lights on said sheet of material oriented in take-off, landing and taxi patterns, the bulbs in said strings of lights being variably spaced such that they are closer together as they approach the runways of said airfield in order to represent a lessening of speed of a plane as it approaches a runway for a landing and an increase in the speed of a plane as it takes off, means to light in succession the bulbs in any string of lights, and means providing a time interval between the successive lighting of bulbs in a string of lights to represent the paths and speeds of planes.

3. An airfield simulator as described in claim 2, in association with an instructor's console comprising control means for selecting any one of the said strings of lights for display, means for selecting any one of a number of time intervals to be applied to said selected string of lights, a student's console, means connecting said student's console to said instructor's console to permit two way communication between the said consoles, indicating instruments on said student's console, and means on the instructor's console to control the setting of said instruments on said student's console, the said simulated airfield being located in front of said student's console to permit the presentation of air control problems to a student.

References Cited in the file of this patent

UNITED STATES PATENTS

| 2,581,358 | Busignies et al. | Jan. 8, 1952 |
| 2,839,840 | Hemstreet | June 24, 1958 |
| 2,858,622 | Parvin et al. | Nov. 4, 1958 |